April 6, 1937. D. E. SEMON 2,076,324
ANTIFREEZE DEVICE FOR MOTOR VEHICLES
Filed Jan. 30, 1935
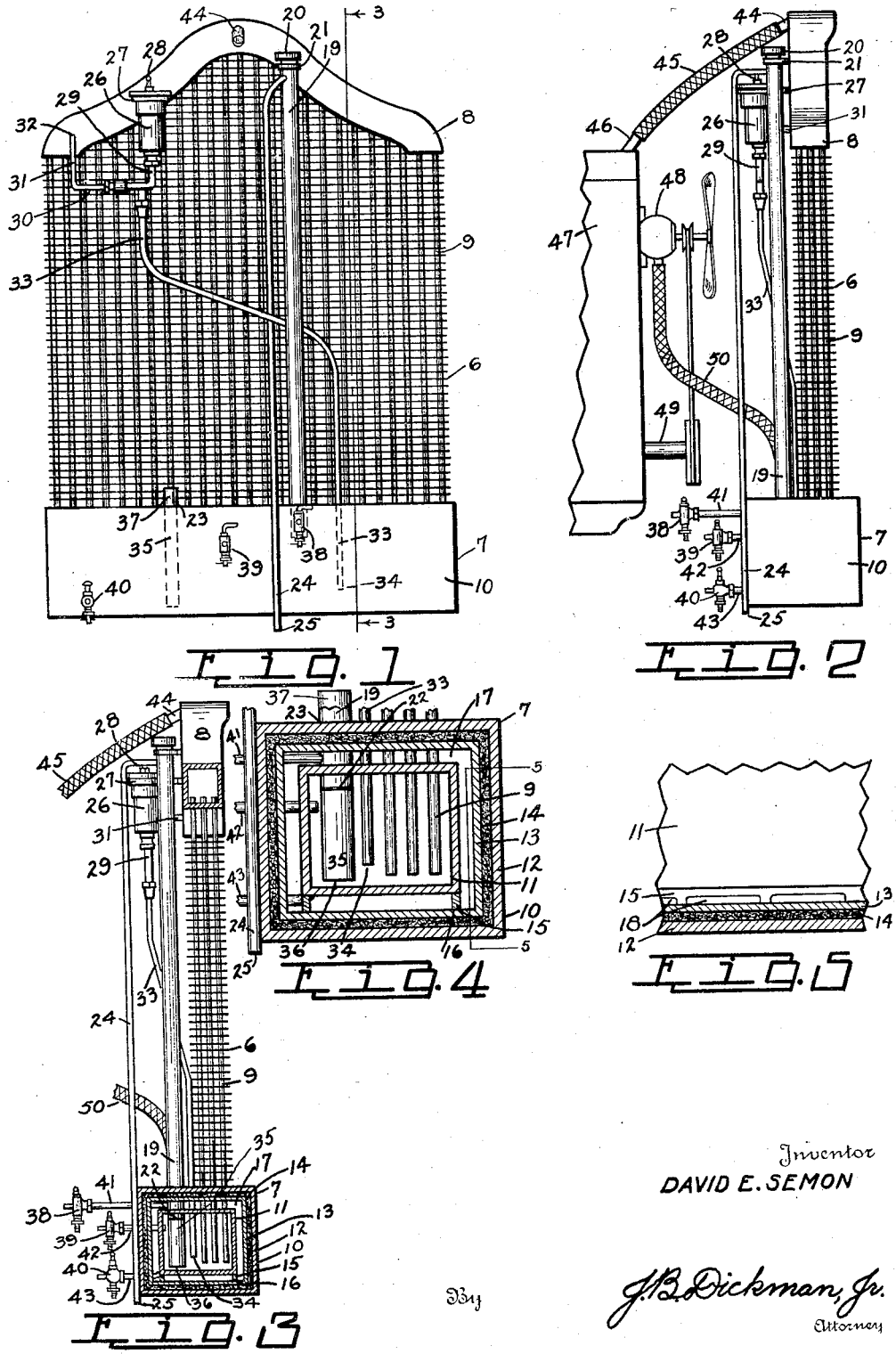
Inventor
DAVID E. SEMON
J. B. Dickman, Jr.
Attorney Patented Apr. 6, 1937

2,076,324

UNITED STATES PATENT OFFICE 2,076,324

ANTIFREEZE DEVICE FOR MOTOR VEHICLES

David E. Semon, St. Pauls, N. C., assignor of one-half to Charles F. Cole, Richmond, Va.

Application January 30, 1935, Serial No. 4,181

9 Claims. (Cl. 123—174)

The present invention relates to an anti-freeze device for motor vehicles, one of the principal objects of which is to provide an anti-freeze cooling system for motor vehicles, being one that is adapted for use on all classes of such vehicles as well as stationary engines, and one which prevents water freezing in the motor, circulating pump and radiator.

Another object of the invention is to provide a circulating pump positioned above the water level in the water storage tank of the radiator.

A still further object of the invention is to provide a water storage tank in connection with the radiator, such tank having an insulated housing enclosing the storage tank and a dead air space between the storage tank and the insulated housing.

A still further object of the invention is to provide automatic means for ventilating the system, and vacuum controlling means for priming and draining the motor and radiator circulating system.

With the foregoing and other objects in view my invention comprises a novel construction and arrangement of parts which will be more apparent as the description proceeds, due consideration being given to the accompanying drawing wherein:—

Figure 1 is a rear elevational view of an automobile radiator, illustrating particularly the connection of the filler tube and vent with the storage tank, and the connection of the vacuum tank with the radiator system and storage tank.

Figure 2 is a side elevational view of Figure 1 illustrating the exterior appendages to the radiator including its connection with the cooling system of the engine and circulating pump, the engine being shown fragmentarily.

Figure 3 is a vertical sectional view taken on line 3—3 of Figure 1, illustrating the water circulating system comprised in the radiator, as well as the placement of the radiator tubes, filling tube, and vacuum tank connecting tube, in the interior of the storage tank.

Figure 4 is an enlarged detail sectional view of the insulated water storage tank per se, parts being shown fragmentarily.

Figure 5 is a fragmentary sectional view taken on line 5—5 of Figure 4, illustrating the supports of the storage tank within its insulated enclosure.

In the drawing illustrating my invention, the numeral 6 represents the well known automobile radiator, having a lower header 7 and a closed upper header 8, the lower header and upper header being in circulatory communication by a plurality of pipes 9 in the well known manner.

The lower header 7 comprises an enclosing case 10 and a water storage chamber or tank 11. The enclosing case 10 is provided with outer walls 12 and inner walls 13, and between these walls is an intervening space 14 which is filled with any suitable insulating material. As shown in Figure 5 the water storage chamber or tank 11 is provided with longitudinal supports 15 on the lower outer wall thereof, the bottom face of said supports if desired, being secured to the bottom inner wall 13 of the enclosing case 10, as illustrated at 16 (Figure 4), the supports holding the walls of the water storage tank 11 in spaced relation to the inner walls 13 of the enclosing case 10, providing a dead air space 17 around the entire water chamber or storage tank 11. The longitudinal supports 15 are provided with longitudinal openings 18, which minimize the possible loss of heat through the connection of said tank supporting members 15 with the bottom inner wall 13 of the enclosing case 10.

From the description so far it can be seen that the construction of the enclosing case 10 with its outer wall 12, the insulation 14, the inner wall 13, and the dead air space 17, is an effective protection against freezing of the water in the storage tank 11.

A filler pipe 19, equipped with a suitable cap 20, is positioned on the back of the radiator and held in rigid position at the top by a strap or bracket 21 secured to the rear outer wall of the upper header 8. The lower portion of the filler pipe is fitted through wall 12, insulation 14, and wall 13 of the enclosing case 10, and through the top wall of the storage tank 11. The end 22 of the filler pipe 19 terminates in close proximity to the inner face of the top wall of the storage tank 11, as illustrated in Figures 3 and 4 of the drawing. The filter pipe 19 may be further secured in rigid position by spot welding, or the like to the top face of the enclosing case 10 at 23.

The filler pipe 19 is equipped with a vent and regulating tube 24, and from the drawing it can be seen that this tube has one end connected adjacent the top of the filler tube and extends downwardly, the lower portion of the tube passing on the outside of the enclosing case 10 of the lower header 7. This portion of the tube is fixedly secured to the outer wall of the enclosing case 10 by soldering, spot welding or the like, the end 25 of the tube extending below the bottom wall of the enclosing case 10. By means of said tube 24 and pipe 19 the water in the storage tank 11 is subject to atmospheric pressure at all times.

Facing the rear of the radiator 6, in the position shown in Figure 1, to the left of the filler pipe 19 a vacuum vent tank 26 is secured to the rear wall of the header tank 8 in any suitable manner, such as by strap 27, a bracket, or the like.

The vacuum vent tank 26 is of the usual float and valve type such as is familiar to those skilled in the automotive art, comprising a liquid inlet from pipe 29, an outlet connecting with pipe 28, and internal float means for closing said outlet, or valve.

The outlet pipe 28 is connected with the intake manifold of the engine 47 through the medium of a suitable connector, such as rubber hose, metal tubing, or the like, thus providing the vacuum creating means, or suction, through the tank 26.

The inlet to the tank and float valve, is connected by pipe 29 and its dual connection with pipe 33 leading to the storage tank 11 and with pipe 30, 31 leading to the header tank 8, as shown in Figures 1 to 4 inclusive, with the lower and higher parts of the water circulating system, thus providing the effect of both ventilating means and vacuum producing means at those points depending upon the opening or closing of said float valve through the connection with the intake manifold and the operation or stopping of the motor, hereinafter explained.

Connecting with the water chamber or storage tank 11 is a pipe 35, the end 36 of said pipe being in close proximity to the inner bottom wall of the water storage tank 11, the pipe being fitted through the top wall of said storage tank 11 and through wall 13, insulation 14, and wall 12 of the enclosing case 10, the upper portion 37 of the pipe 35 extending an appreciable distance above the outer surface of the enclosing case 10 and providing a connecting means to the circulating pump to be later described.

On the rear outer wall of the enclosing case 10 are a plurality of regulating cocks 38, 39 and 40. The vent and regulating cock 38 is connected to the filler pipe 19 through the medium of a pipe 41 and provides a means for reducing the water level in said pipe and in the entire system to the level of said cock. The vent and regulating cock 39 connects with the storage tank 11 through the medium of a pipe 42, the end of this pipe terminating adjacent one of the inner side walls of the storage tank 11 and serves when open to prevent excess filling of the tank 11. The cock 40 is a drain cock and connects with the bottom walls of the storage tank 11 through the medium of a pipe 43 and provides a means for cleaning and completely draining the tank 11.

The distributor header 8 is provided with a connector tube 44 to which is connected in any suitable manner one end of a hose 45 or other suitable connecting means, the other end of the hose being connected to the water jacket of the motor 47 at 46. On the front of the motor 47 I have illustrated conventionally a circulating pump 48, having a fan and pulley shaft, and driven by the motor through the medium of a belt and pulley mounted on the shaft 49. It is to be noted that the circulating pump is located above the header 7 and its storage tank 11, it being assumed that said pump is also at the lowest water level in the water jacket of the motor. The circulating pump 48 is connected to the storage tank 11 through the medium of a hose 50, the lower end of the hose being connected to the connector head 37 of the pipe 35, above described. The outflow of the circulating pump is connected to the inflow side of the water jacket of the engine 47 in the usual manner.

To describe the operation of my device, assuming the storage tank 11 is empty and the motor idle. Water is fed into the filler pipe 19 and carried by this pipe to the storage tank 11 until said tank is filled. The vent and regulating cock 38 provides a means for eliminating water from the system above its level.

When the motor 47 is started and running two distinct operations take place. First, a suction is developed and maintained through the vacuum vent tank 26 by its connection with the intake manifold of the motor through the medium of outlet pipe connection 28. Air in the pipe 33, the header tank 8, tubes 9, and other portions of the circulating system above the water level in the storage tank 11 is withdrawn by the suction from the intake manifold through pipes 31 and 29, and through the vent tank 26 into line 28. The suction of air reduces the atmospheric pressure in the system above the water level, siphonage is created, and the water rises in pipes 33, 9, 35 and 50, the rising water being assisted by the effect of the atmospheric pressure through filler pipe 19. Second, the water continuing to rise until it reaches the level of the operating circulating pump 48, it is thereby primed and starts circulating the water through the system in the usual manner.

As operation continues and further vacuum is created above the water level, the water continues to rise in pipes 9, 33 and 29, entering the tank 26, and by operation of the float valve closes the outlet of the tank to pipe 28 and prevents access of the water to the engine manifold. The water level in the system resulting from the pumping operation continues to rise and is soon above the level of the vent tank 26 and keeps the float valve closed, assisted by the effect of continued suction in the pipe 28 upon the opposite side of the valve, and as long as the motor runs water will stay in the vacuum vent tank 26 and the valve outlet therein will remain closed.

The priming of the circulating pump by the rising water causes the pump to pick up the water, as hereinbefore referred to, forcing it through the water jacket of the motor 47 to pipe 45, through pipe 45 to the header tank 8, through pipes 9 to the storage tank 11, and as long as the motor runs this circulation of the water through the system continues and assists in keeping the motor cool.

Referring to Figures 3 and 4, it will be noted that the radiator pipes 7, vacuum tank inlet pipe 33, and pump connecting pipe 35 terminate at points adjacent the bottom of the storage tank 11, which keeps them below the water level when the tank is full as well as when such level has been lowered by the siphonage and the pumping operations hereinbefore described have transferred some of the contents of the storage tank to the other portions of the circulating system. Access of air to such pipes by way of the tank 11 is thus prevented.

When the motor stops, the circulating pump 48 stops, and the circulatory movement of the water stops. The suction from the intake manifold that assists in keeping the outlet of tank 26 closed by its float valve also ceases, and the suction action in pipe 28 is replaced by sufficient ventilation admitted at the carburetor of the motor and passing through the intake manifold and connector pipe 28 to allow the float in tank 26 to drop slightly and allow such ventilation to enter the system.

Pipes 31, 29 and 33, immediately upon the uncovering of the valve seat, serve to drain the vacuum tank 26, and the header tank 8, the float returning to its normal open position when the tank 26 is emptied. Thereupon the water in the whole system will drain by gravity into the storage tank 11 where it is protected against freezing by the insulation provided by the air space 17 and the inner wall 13, insulation 14, and outer wall 12 of the case 10, until the motor is again started.

While the principles of the invention will always be adhered to, the invention is susceptible to certain changes and modifications and I do not wish to limit myself to the exact structure, and changes may be made without departing from the spirit or scope of the invention, but:—

What I claim is:—

1. In an anti-freeze device for use in combination with an internal combustion engine, comprising a header tank, a storage tank below said header tank, liquid conducting means connecting said header tank and storage tank, means for connecting said storage tank with the inlet of the water circulating system of said engine and means for connecting said header tank with the outlet of said system, vent pipe means connected with the storage tank, a float valve above said water circulating system of the engine, means for connecting the exit of said valve with the engine intake manifold, and dual pipe means connecting the intake of said valve with said header tank and with said storage tank.

2. In an anti-freeze device for use in combination with an internal combustion engine, comprising a radiator means, a tank below said radiator means, pipe means connecting said radiator means and tank, means for connecting said tank with the inlet of the water circulating system of said engine and means for connecting the top of said radiator means with the outlet of said system, vent pipe means connected with said tank, a float valve above said water circulating system of the engine, means for connecting the exit of said valve with the engine intake manifold, and dual pipe means connecting the intake of said valve with the top of said radiator means and with said tank.

3. In an anti-freeze device for use in combination with an internal combustion engine, comprising a header tank, a storage tank below said header tank, liquid conducting means connecting said header tank and storage tank, said means terminating in the lower level of said storage tank, vent means in the upper level of said storage tank, means for connecting the lower level of said storage tank with the inlet of the water circulating system of said engine and means for connecting said header tank with the outlet of said system, a float valve above the water circulating system of the engine, means for connecting the exit of said valve with the engine intake manifold, and dual pipe means connecting the intake of said valve with said header tank and with the lower level of said storage tank.

4. In an anti-freeze device for use in combination with an internal combustion engine, comprising a radiator means, a storage tank below said radiator means, pipe means connecting said radiator means and storage tank and terminating in the lower level of said storage tank, vent means in the upper level of said storage tank, means for connecting the lower level of said storage tank with the inlet of the water circulating system of said engine and means for connecting the top of said radiator means with the outlet of said system, a float valve above said water circulating system of the engine, means for connecting the exit of said valve with the engine intake manifold, and dual pipe means connecting the intake of said valve with the top of said radiator means and with the lower level of said storage tank.

5. In an anti-freeze device for motor vehicles comprising in combination with the water circulating system of an internal combustion engine, a storage tank below the level of said circulating system, inlet and outlet connections of said system with said storage tank, vent pipe means connected with said tank, a float valve above said water circulating system, pipe means connecting the exit of said valve with the engine intake manifold, and dual pipe means connecting the intake of said valve with the top of said circulating system and with said storage tank.

6. In an anti-freeze device for motor vehicles comprising in combination with the water circulating system of an internal combustion engine, a storage tank below the level of said circulating system, a vent means in the upper level of said storage tank, inlet and outlet connections of said system with said storage tank terminating in the lower level of said tank, a float valve above said water circulating system, pipe means connecting the exit of said valve with the engine intake manifold, and dual pipe means connecting the intake of said valve with the top of said circulating system and the lower level of said storage tank.

7. In an anti-freeze device for motor vehicles comprising the combination of an internal combustion engine with a header tank and a storage tank below said header tank, water circulating means connecting said engine, header, and storage tank and including a pump means, said pump means being above said storage tank, vent pipe means connected with said storage tank, a float valve above said pump means, pipe means connecting the exit of said valve with the engine intake manifold, and pipe means connecting the intake of said valve with said header tank and with said storage tank.

8. In an anti-freeze device for motor vehicles comprising the combination of an internal combustion engine with a header tank and a storage tank below said header tank, water circulating means connecting said engine, header, and storage tank and pump means, an open filling pipe in said storage tank and terminating in the upper level thereof, the inlet and outlet connections of said water circulating means terminating in the lower level of said system, said water circulating means being above said storage tank, a float valve above said pump means, pipe means connecting the exit of said valve with the engine intake manifold, and pipe means connecting the intake of said valve with said header tank and the lower level of said storage tank.

9. An anti-freeze device for motor vehicles comprising, in combination with an internal combustion engine of the circulating pump and water jacket type, a header tank, an insulated storage tank below the header tank, an open filling pipe in said storage tank and terminating adjacent the inside upper surface thereof, liquid conducting means connecting said header tank and storage tank, said means terminating in close proximity to the inside bottom of said storage tank, water circulating means connecting the lower portion of said storage tank with the inlet to the pump and water jacket of said engine and the exit of said water jacket with the header tank, said water circulating means above said storage tank, a float valve above the engine pump, a pipe connecting the exit of said valve with the engine intake manifold, and pipe means connecting the intake of said valve with said header tank and the lower portion of said storage tank.

D. E. SEMON.